(12) United States Patent
Hamzeh et al.

(10) Patent No.: US 6,966,614 B2
(45) Date of Patent: Nov. 22, 2005

(54) ARCHITECTURE FOR A HYDRAULIC CIRCUIT

(75) Inventors: Walid Hamzeh, Levignac (FR); Jérôme Libourel, Chaville (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 10/483,498

(22) PCT Filed: Jul. 2, 2002

(86) PCT No.: PCT/FR02/02297

§ 371 (c)(1),
(2), (4) Date: Jan. 12, 2004

(87) PCT Pub. No.: WO03/008811

PCT Pub. Date: Jan. 30, 2003

(65) Prior Publication Data
US 2004/0195909 A1 Oct. 7, 2004

(30) Foreign Application Priority Data
Jul. 12, 2001 (FR) .................................. 01 09274

(51) Int. Cl.$^7$ .......................... F15B 20/00; B64C 13/42
(52) U.S. Cl. .................... 303/10; 188/151 A; 188/152; 303/6.01; 303/84.1; 244/111
(58) Field of Search ................. 303/10, 9, 2, 13–18, 303/6.01, 3, 9.61, 84.1–84.2, 9.62, 9.63; 244/111, 78, 75 R; 188/151 A, 152, 106 P, 188/16, 354; 91/509–510, 19–20, 459; 60/403, 60/405, 421, 464, 478, 476, 406

(56) References Cited

U.S. PATENT DOCUMENTS

| 5,397,173 A | 3/1995 | Bourguet |
| 6,663,192 B2 * | 12/2003 | Bourguet et al. ............. 303/15 |

FOREIGN PATENT DOCUMENTS

| DE | 196 54 781 A | 7/1998 |
| EP | 0 328 175 A | 8/1989 |
| EP | 0 477 079 A | 3/1992 |
| FR | 2 224 657 A | 10/1974 |
| FR | 2 185 089 A | 4/2002 |
| WO | WO 2003/008811 A3 * | 1/2003 |

OTHER PUBLICATIONS

STIC tranlsation of DE19654781.*

* cited by examiner

Primary Examiner—Douglas C. Butler
(74) Attorney, Agent, or Firm—Sughrue Mion, PLLC

(57) ABSTRACT

The invention relates to an architecture for a hydraulic circuit associated with actuators (100), such as actuators for airplane brakes, the architecture comprising a main hydraulic circuit (C) having hydraulic components (4, 5 101, 6) and adapted to convey hydraulic fluid pressurized by at least one pressure generator (2) associated with a main supply (1) to the actuators (100). The architecture includes an emergency system comprising an auxiliary supply (8) permanently fed by a return circuit (R) collecting the returns from all of the hydraulic components (4, 5,101, 6), the auxiliary supply (8) being connected to the main supply (1) via a relief valve (9). The emergency system further comprising an electrically driven pump unit (10) arranged to take fluid from the auxiliary supply (8) and to inject it into the main circuit (C) downstream from a general check valve (3).

10 Claims, 1 Drawing Sheet

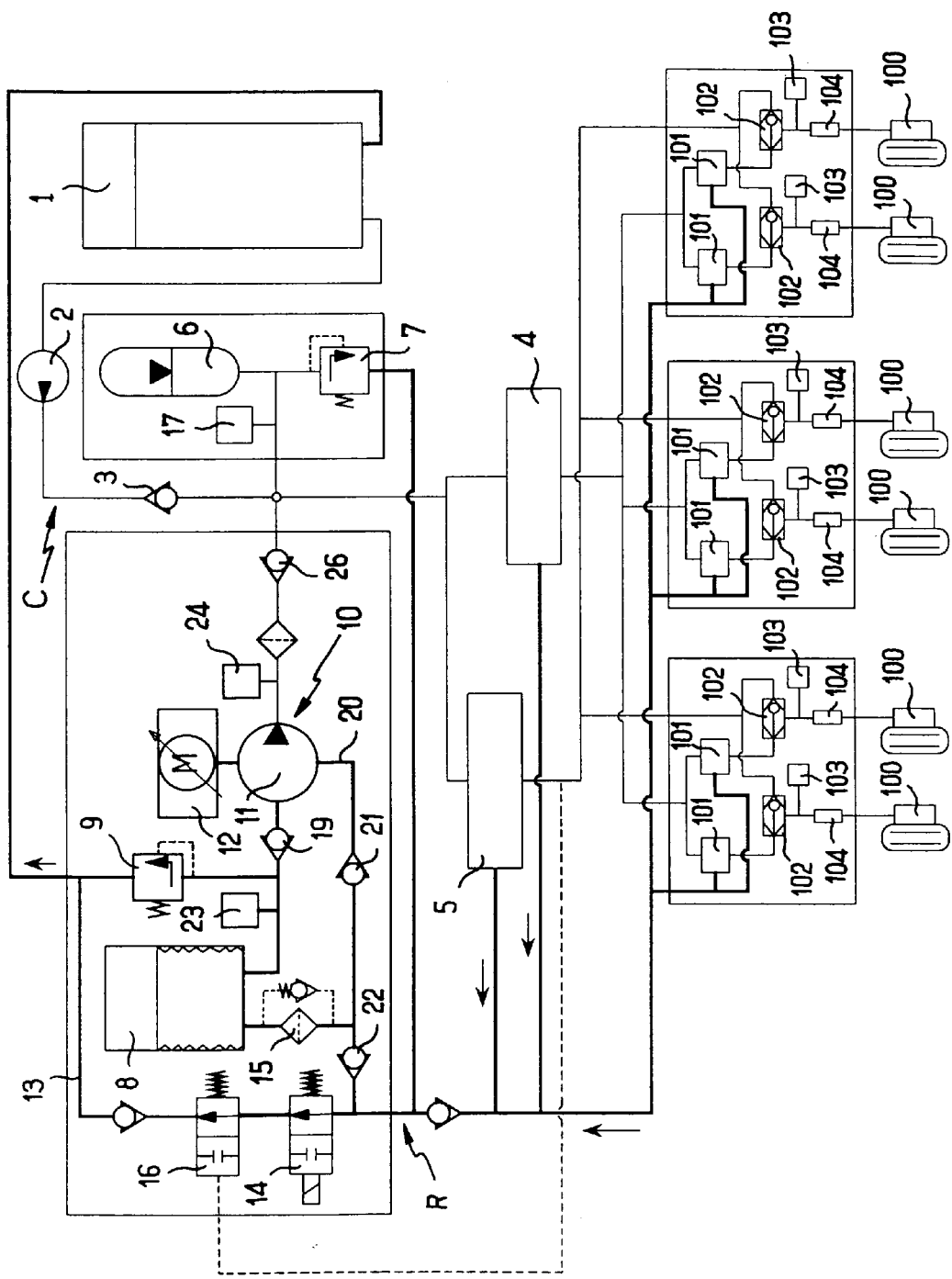

ARCHITECTURE FOR A HYDRAULIC CIRCUIT

The invention relates to an architecture for a hydraulic circuit such as those installed in an airplane to feed the braking actuators of the airplane.

Some of the functions ensured by such actuators are critical, i.e. loss of the function would be catastrophic for passengers, not to mention possible damage to the airplane itself.

Consequently, safety requirements lead to airplane systems being designed in such a manner as to ensure that a single breakdown in a system (e.g. breakdown of the main hydraulic circuit) cannot lead to a catastrophe.

Thus, airplanes are generally fitted with an emergency hydraulic circuit from which hydraulic fluid is conveyed to the actuators in the event of a failure of the main circuit.

Given the size presently being envisaged for commercial airliners, the pipework in hydraulic circuits is becoming so long as to constitute a non-negligible fraction of the total weight of the airplane, particularly since the number of actuators that need to be fed increases with increasing airplane size. It is thus penalizing to duplicate a main hydraulic circuit with an emergency circuit.

In order to save weight, it is known that the nominal pressure of hydraulic circuits can be increased (for example from 206 bars to 315 bars). Such an increase in pressure makes it possible to reduce the working areas of actuators prorata the ratio of nominal pressures, and it also makes it possible to reduce the diameter of the pipework. However, increasing pressure in this way provides only a limited saving in weight, and in any event it does not enable the hydraulic circuits of an airplane to be simplified.

In order to simplify and lighten the braking system of such an airplane, an architecture is known, in particular from document DE-A-196 54 781, for a hydraulic circuit associated with a servo-control, said architecture comprising a main feed line and a return line having hydraulic components and adapted to convey hydraulic fluid pressurized by at least one pressure generator to the servo-control, said architecture further including an emergency system.

The emergency system comprises both an isolating valve making it possible in the event of a problem to isolate the feed and return lines of the hydraulic circuit, and also an electrically-driven pump taking fluid from the return line so as to inject it into the feed line downstream from the isolating valve, so that the fluid circulates around a closed circuit. An accumulator placed in the return line and maintained under pressure in normal operation by means of a relief valve on the return line serves to maintain some minimum pressure level in the return line during emergency operation and to absorb or supply a differential flow rate between the chambers of the servo-control, or indeed to absorb thermal expansion of the fluid.

Although that architecture is well adapted to servo-controls for operating control surfaces, it is not suitable as described for use in a braking circuit. In the event of a feed pipe in a brake circuit rupturing, the accumulator which contains only a small volume of fluid would empty very quickly and would not be sufficient to guarantee braking over enough time to stop the airplane. In other words, if the accumulator is to perform the function of providing pressure, then it cannot also perform the function of delivering fluid at a rate sufficient for the safety of the airplane.

The technological background is also illustrated by documents EP 0 328 175, GB 2 110 330, U.S. Pat. No. 5,397,173, FR 2 224 657, U.S. Pat. No. 4,616,881, and EP 0 477 079.

The invention provides an architecture for a hydraulic circuit associated with actuators, the architecture comprising a main hydraulic circuit having hydraulic components and adapted to convey hydraulic fluid pressurized by at least one pressure generator associated with a main supply to the actuators, the architecture further comprising an emergency system which comprises an auxiliary supply continuously fed by a return circuit collecting the returns from all of the hydraulic components, the auxiliary supply itself being connected to the main supply via a relief valve, said emergency system further comprising an electrically driven pump unit arranged to take fluid from the auxiliary supply and inject it into the main circuit downstream from a general check valve.

Thus, in normal operation, the pressure generator takes fluid from the main supply and injects it into the main circuit. The fluid is then conveyed to the actuators with all of the returns being collected by the return circuit and delivered to the auxiliary supply.

The fluid contained therein is then returned to the main supply with the exception of a minimum volume of fluid that is determined by the rated pressure of the relief valve. Such an emergency system thus has no effect during normal operation on the hydraulic circuit other than the volume of fluid which is permanently stored in the auxiliary supply.

In the event of the pressure generator failing, the pump unit takes over, injecting pressurized fluid into the main circuit, said fluid being taken from the auxiliary supply. Since the returns from the hydraulic components are delivered to the auxiliary supply, the emergency system thus operates as a closed circuit without the fluid needing to transit through the main supply.

The minimum volume of fluid present on a permanent basis in the auxiliary supply is thus determined in practice to be such as to ensure that the pump unit can always find a sufficient volume of fluid to be able to satisfy the flow rate demands coming from the actuators. In particular, the size of the auxiliary supply is advantageously designed to be quite large so that in the event of a feed pipe to a brake rupturing, it is possible to continue braking the airplane during a length of time that is sufficient to ensure that it comes to rest.

Thus, the auxiliary supply, unlike prior art accumulators, constitutes not only a source of pressure suitable for ensuring some minimum level of pressure at the inlet of the pump unit, but also as a source of flow rate in the event of a pipe rupturing.

It can thus be understood that the pressure in the auxiliary supply is thus determined by the threshold of the relief valve which is generally selected to be relatively low. The auxiliary supply is therefore never subjected to the high pressure generated by the pressure generator of the main hydraulic circuit.

Furthermore, unlike an accumulator, the inside of the auxiliary supply is continuously swept in normal operation because all of the returns are arranged to pass through this supply, thereby ensuring that pollution does not build up inside the auxiliary supply.

Advantageously, the emergency system comprises a branch line connecting the return circuit directly to the main supply, a solenoid valve being arranged on said branch line so as to be closed in normal operation and open in the event of an incident occurring in the emergency system.

This makes it possible to short-circuit the auxiliary supply, for example in the event of the auxiliary supply becoming blocked.

Preferably, the hydraulic components include an accumulator which is placed on the main circuit downstream from the general check valve.

This accumulator serves to satisfy sudden demands for flow rate coming from the actuators, in the event of the pump unit not having sufficient time to react. The accumulator can thus temporarily deliver a quantity of oil to the actuators, with the pump unit subsequently having the time to recharge the accumulator.

Advantageously, the accumulator is associated with a relief valve connected to the return circuit.

Thus, overflow from the accumulator empties out into the auxiliary supply.

Preferably, a pressure sensor is associated with the accumulator.

The sensor serves to monitor variations of pressure inside the accumulator, and to actuate the pump unit in the event of an unacceptable drop in the pressure that exists inside the accumulator.

For a circuit in which the main circuit includes means providing direct communication between the accumulator and the actuators, said means providing communication being activated when the pressure generator is stopped, a valve is preferably arranged on the branch line so as to be closed when the direct communication means are activated.

Thus, the fluid which transits via the components of the communication means is directed to the auxiliary supply and cannot pass via the branch line to flow into the main supply.

On starting, if the pressure in the accumulator is too low, then the accumulator is recharged by the pump unit using fluid that has collected in the auxiliary supply.

Preferably, the pump unit comprises a constant flow rate pump associated with a variable speed electric motor.

Thus, the flow rate does not depend on pressure conditions existing upstream and downstream from the pump, so it is possible to adjust flow rate by using simplified motor control.

When the invention is applied to an airplane braking circuit in which the actuators are the brakes themselves, the hydraulic components include at least one braking selector which is arranged in the main circuit downstream from the general check valve, said braking selector having a return line connected to said return circuit.

In this way, the hydraulic components include at least one parking selector arranged in the main circuit, together with an accumulator arranged in said main circuit upstream from said parking selector, the parking selector having a return line connected to said return circuit.

A shuttle valve is then preferably installed upstream from each brake, each shuttle valve being connected firstly to the braking selector via a proportional control valve, each proportional control valve having a return line connected to said return circuit, and secondly to the parking selector.

Other characteristics and advantages of the invention appear more clearly in the light of the following description of a particular, non-limiting embodiment of the invention. Reference is made to the sole FIGURE of the accompanying drawing, which shows a hydraulic circuit architecture of the invention as applied to a braking circuit for an airplane.

The invention is described below with reference to a hydraulic braking circuit for an airplane arranged to power brakes given overall reference 100. In the FIGURE, heavy lines are used to represent return lines, and light lines are used to represent feed lines.

In conventional manner, such a hydraulic circuit comprises a main supply 1 of fluid maintained under pressure (typically a few bars), from which a pressure generator 2 takes fluid for delivering to the main pressurized circuit C, in this case at a pressure of 350 bars. The pressure generator 2 is constituted, for example, by a pump driven by one of the jets of the airplane. The main circuit C has a general check valve 3, for protecting the pressure generator 2.

Also in conventional manner, the main circuit C includes a braking selector 4 and a parking selector 5.

Downstream from the braking selector 4 there are as many proportional control valves 101 as there are brakes 100, each being connected to the corresponding brake via a shuttle valve 102. The shuttle valves 102 are also connected to the outlet from the parking selector 5.

When the airplane is taxiing on the ground, the braking selector 4 is open while the parking selector 5 is closed.

The fluid is thus taken to the proportional control valves 101 which serve to modulate the pressure of the fluid acting on the brakes so as to adjust the braking torque of each brake in response to orders from the pilot, or indeed to instructions from an anti-blocking system.

For this purpose, pressure sensors 103 are installed on all of the lines feeding the brakes 100 to measure the pressure that is actually applied to each brake 100, and possibly to modulate opening of the corresponding proportional control valve 101 if the measured pressure departs from the reference pressure.

When the airplane is at a parking place with its jets turned off, the braking selector 4 is closed while the parking selector 5 is open, thus enabling the brakes 100 to be fed with fluid that is maintained under pressure by an accumulator 6 placed downstream from the general check valve 3. This ensures that the brakes 100 are locked on and thus that the airplane is prevented from moving when parked. It should be observed that the accumulator 6 is protected from excess pressure by a pressure relief valve 7.

Hydraulic fuses 104 are installed on the lines feeding the brakes 100 downstream from the shuttle valves 102 in order to protect them against possible excess pressure.

It is known that all of the hydraulic components of the main circuit C organizing the distribution of fluid to the brakes 100 are liable to present a fluid return. These returns are the result either of fluid flows coming from the brakes (proportional control valves 101), or else from leaks from the components themselves (braking and parking selectors 4 and 5), or indeed from the opening of the relief valve 7 that protects the accumulator 6.

In the invention, the hydraulic circuit is provided with a special emergency system. In accordance with an essential characteristic of the architecture of the invention, the returns from all of the hydraulic components of the main circuit C (in this case the braking selector 4, the parking selector 5, the proportional control valves 101, and the accumulator 6 together with its relief valve 7) are collected together in a return circuit R drawn in heavy lines in the FIGURE so as to be delivered into an auxiliary supply 8 via a filter 15.

The auxiliary supply 8 is connected to the main supply 1 via a relief valve 9 so as to limit the pressure in the auxiliary supply 8 to a predetermined low value, typically a few bars.

An electrically driven pump unit 10 constituted by a constant flow rate pump 11 and a variable speed electric motor 12 is arranged to draw fluid from the auxiliary supply 8 and inject it into the main circuit downstream from the general check valve 3.

In order to protect the pump 11 of the unit 10, check valves 19 and 26 are disposed respectively upstream and downstream from the pump 11.

In addition, the leak collector 20 from the pump 11 is connected to the return circuit R via a check valve 21, a check valve 22 connected in the opposite direction, guiding the fluid that comes from the leak collector 20 of the pump 11 to the auxiliary supply 8.

The hydraulic circuit operates as follows.

The description begins by examining the situation during normal operation of the pressure generator 2.

Fluid is taken by the pressure generator 2 from the main supply 1 and injected into the main circuit C which takes the fluid to the brakes 100. Fluid returns from the hydraulic components are then channeled via the return circuit R to the auxiliary supply 8. Once the auxiliary supply 8 has become so full that its pressure exceeds the pressure for which the relief valve 9 is rated, the fluid returns finally to the main supply 1. Thus, in normal operation, the emergency system is transparent and has no influence on the operation of the hydraulic fluid, except that a volume of fluid is permanently stored in the auxiliary supply 8, with said volume being determined by the threshold of the relief valve 9.

In this respect, a branch connection 13 is provided enabling the fluid collected by the return circuit R to be sent directly to the main supply 1. In normal operation, this branch line 13 is closed by a solenoid valve 14. If an incident is detected in the auxiliary supply 8 (for example its filter 15 has become clogged), then the valve 14 is automatically opened so as to allow fluid to return to the main supply 1 without the fluid transiting via the auxiliary supply 8.

In the configuration shown herein, the valve 14 is open so long as it is not powered electrically, such that the branch line 13 is open when the airplane is parked.

Unfortunately, this can be troublesome insofar as when parked, as explained above, the pressure in the accumulator 6 is transmitted to the brakes 100 via the parking selector 5. Fluid escaping by leaking from the parking selector 5 would then be taken via the return circuit R and the branch line 13 directly to the main supply 1.

The branch line 13 is provided with a hydraulically controlled valve 16 with hydraulic control coming from a line that is tapped downstream from the parking selector 5. The valve 16 is open so long as the parking selector 5 is closed, and it is closed when the parking selector 5 is open. Thus, fluid escaping from the accumulator 6 and collected by the return circuit R is directed to the auxiliary supply 8.

When the airplane starts, the pressure in the accumulator 6 is known by means of an associated pressure sensor 17, and if this pressure is too low, then the pump unit 10 is activated to increase the pressure in the accumulator 6 using fluid present in the auxiliary supply 8.

We now examine the situation that arises when the pressure generator 2 fails. The supply of fluid in response to instantaneous calls for fluid by the brakes 100 is then ensured by the accumulator 6. The accumulator is progressively repressurized by the pump unit 10 as the pressure in the accumulator 6 drops and is tracked by the pressure sensor 17.

The fluid thus flows from the auxiliary supply 8 into the main circuit C via the pump unit 10 to return to the auxiliary supply 8 via the return circuit R. A closed emergency hydraulic circuit is thus provided making use of some of the elements of the main hydraulic circuit C and remedying failure of the pressure generator 2.

By using the emergency system of the invention, it is possible to increase operating safety of the braking circuit to a considerable extent, while avoiding any need to duplicate the hydraulic braking circuit in full.

Furthermore, pressure sensors 23 and 24 are advantageously provided upstream and downstream from the pump 11 of the unit 10 providing information used for defining the speed of rotation of the electric motor 12 so as to adjust the flow rate of the pump to the flow rate needed for recharging the accumulator 6.

The invention is not restricted to the particular embodiment described above, but on the contrary it extends to cover any variant coming within the ambit of the invention as defined by the claims.

In particular, although the means for maintaining pressure in the brakes during parking are shown as being constituted by the parking selector and shuttle valves, the invention is equally applicable to any other architecture having means providing direct communication between the accumulator and the brakes. It should be observed that the pressure can be delivered under such circumstances by an accumulator that is not connected to the circuit.

Furthermore, it is possible to replicate such an emergency system for fitting to such and such a group of accumulators associated with the same main circuit of a specific emergency system. Thus, the failure of an emergency system does not cause the other emergency systems to fail, and each emergency system can be dimensioned very closely to the requirements of each group of actuators.

What is claimed is:

1. An architecture for a hydraulic circuit associated with actuators (100), the architecture comprising a main hydraulic circuit (C) having hydraulic components (4, 5 101, 6) and adapted to convey hydraulic fluid pressurized by at least one pressure generator (2) associated with a main supply (1) to the actuators (100), the architecture further comprising an emergency system, wherein the emergency system comprises an auxiliary supply (8), which is continuously fed by a return circuit (R) collecting the returns that collects returned fluid from all of the said hydraulic components (4, 5, 101, 6), the auxiliary supply (8) itself being connected to the main supply (1) via a relief valve (9), said emergency system further comprising an electrically driven pump unit (10) arranged to take fluid from the auxiliary supply (8) and inject it said fluid into the main circuit (C) downstream from a general check valve (3).

2. A hydraulic circuit architecture according to claim 1, wherein the emergency system comprises a branch line (13) connecting the return circuit (R) directly to the main supply (1), a solenoid valve (14) being arranged on said branch line (13) so as to be closed in normal operation and open in the event of an incident occurring in the emergency system.

3. A hydraulic circuit architecture according to claim 1, wherein the hydraulic components include an accumulator (6) which is placed on the main circuit (C) downstream from the general check valve (3).

4. A hydraulic circuit architecture according to claim 3, wherein the accumulator (6) is associated with a relief valve (7) connected to the return circuit (R).

5. A hydraulic circuit architecture according to claim 3, wherein a pressure sensor (17) is associated with the accumulator (6).

6. A hydraulic circuit architecture according to claim 2, wherein the hydraulic components include an accumulator (6) which is placed on the main circuit (C) downstream from the general check valve (3), and wherein the main circuit (C) includes means (5, 102) providing direct communication between the accumulator (6) and the actuators (100), said means (5, 102) providing communication being activated when the pressure generator (2) is stopped, a valve (16) also being arranged on the branch line (13) so as to be closed when the direct communication means (5, 102) are activated.

7. A hydraulic circuit architecture according to claim 1, wherein the pump unit (10) comprises a constant flow rate pump (11) associated with a variable speed electric motor (12).

8. An architecture according to claim 1 for a hydraulic circuit associated with the brakes (100) of an airplane braking circuit, wherein the hydraulic components include at least one braking selector (4) which is arranged in the main circuit (C) downstream from the general check valve (3), said braking selector (4) having a return line connected to said return circuit (R).

9. A hydraulic circuit architecture according to claim 8, wherein the hydraulic components include at least one parking selector (5) arranged in the main circuit (C), together with an accumulator (6) arranged in said main circuit upstream from said parking selector, the parking selector (5) having a return line connected to said return circuit (R).

10. A braking circuit according to claim 8, wherein a shuttle valve (102) is installed upstream from each brake (100), each shuttle valve (102) being connected firstly to the braking selector (4) via a proportional control valve (101), each proportional control valve (101) having a return line connected to said return circuit (R), and secondly to the parking selector (5).

* * * * *